United States Patent
Tran et al.

(10) Patent No.: US 10,810,171 B2
(45) Date of Patent: *Oct. 20, 2020

(54) MERGING DATA FROM A SOURCE LOCATION INTO A TARGET LOCATION

(71) Applicant: Micro Focus LLC, Santa Clara, CA (US)

(72) Inventors: Hoa Binh Nga Tran, Andover, MA (US); Andrew Allinson Lamb, Boston, MA (US); Matthew Steven Fuller, Medfield, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 105 days.

This patent is subject to a terminal disclaimer.

(21) Appl. No.: 15/864,246

(22) Filed: Jan. 8, 2018

(65) Prior Publication Data

US 2018/0129683 A1 May 10, 2018

Related U.S. Application Data

(63) Continuation of application No. 14/398,249, filed as application No. PCT/US2012/040505 on Jun. 1, 2012, now Pat. No. 9,864,763.

(51) Int. Cl.
| | |
|---|---|
| *G06F 7/00* | (2006.01) |
| *G06F 16/21* | (2019.01) |
| *G06F 16/23* | (2019.01) |
| *G06F 16/25* | (2019.01) |
| *G06F 16/33* | (2019.01) |

(52) U.S. Cl.
CPC ............ *G06F 16/211* (2019.01); *G06F 16/23* (2019.01); *G06F 16/254* (2019.01); *G06F 16/3341* (2019.01)

(58) Field of Classification Search
CPC .... G06F 16/25; G06F 16/254; G06F 16/3341; G06F 16/211
See application file for complete search history.

(56) References Cited

U.S. PATENT DOCUMENTS

| | | | |
|---|---|---|---|
| 5,768,588 A | 6/1998 | Endicott | |
| 6,014,667 A * | 1/2000 | Jenkins | ............. H04L 29/12066 |
| 6,650,639 B2 | 11/2003 | Doherty | |

(Continued)

OTHER PUBLICATIONS

Berstein, Using Semi-Joins to Solve Relational Queries, J. ACM, 1981 (16 pages).

(Continued)

*Primary Examiner* — Daniel A Kuddus

(57) ABSTRACT

In an example, data from a source location is merged into a target location containing existing data, in which the source location and the target location contain tuples of data. For each tuple in the source location, during a single operation, a determination is made as to whether there is a matched tuple in the target location that satisfies a predetermined condition. For each matched tuple that satisfies the predetermined condition, the matched tuple in the target location is updated with a count value that is equal to a count of the matched tuple in the source location and the target location. In addition, for each tuple that does not have a matched tuple that satisfies the predetermined condition, the unmatched tuple is inserted into the target location.

18 Claims, 12 Drawing Sheets

(56) References Cited

U.S. PATENT DOCUMENTS

| | | | |
|---|---|---|---|
| 6,715,148 B1 | 3/2004 | Endicott | |
| 6,906,645 B2 * | 6/2005 | Jones | G06T 9/005 |
| | | | 341/51 |
| 6,983,447 B1 | 1/2006 | Endicott | |
| 7,016,903 B1 | 3/2006 | Thusoo | |
| 7,089,266 B2 * | 8/2006 | Stolte | G06F 40/18 |
| | | | 707/769 |
| 7,222,123 B2 | 5/2007 | Gu et al. | |
| 7,366,725 B2 | 4/2008 | Jordan | |
| 7,383,262 B2 * | 6/2008 | Das | G06Q 50/16 |
| 7,523,123 B2 | 4/2009 | Yang et al. | |
| 7,627,513 B2 * | 12/2009 | Kolos | G06Q 40/00 |
| | | | 705/36 R |
| 7,627,613 B1 | 12/2009 | Dulitz | |
| 7,676,525 B2 | 3/2010 | Stefani et al. | |
| 7,804,498 B1 | 9/2010 | Graham | |
| 7,805,483 B2 | 9/2010 | Mitchell | |
| 7,949,610 B2 * | 5/2011 | Belvin | G06Q 10/06 |
| | | | 705/301 |
| 8,185,567 B2 * | 5/2012 | Mitchell | G06F 16/29 |
| | | | 707/827 |
| 8,443,242 B2 | 5/2013 | Weingarten | |
| 8,468,171 B2 | 6/2013 | Nishiyama | |
| 2004/0199519 A1 | 10/2004 | Gu | |
| 2004/0243593 A1 * | 12/2004 | Stolte | G06F 17/246 |
| 2008/0120314 A1 * | 5/2008 | Yang | G06F 16/2456 |
| 2008/0235260 A1 * | 9/2008 | Han | G06F 40/151 |

OTHER PUBLICATIONS

Chen et al., On applying hash filters to improving the execution of multi-join queries, The VLDB Journal, 1997 (11 pages).
European Patent Office, "Supplementary Search Report", PCT/US2012040505, dated Oct. 27, 2015, 9 pages.
IBM Informix 11.50, What's New in Version 11.50 of IBM Informix, pp. 1-39, download date May 21, 2012. <http://publib.boulder.ibm.com/infocenter/idshelp/v115/index.jsp?topic=%2Fcom.ibm.po.doc%2Fnew_features.htm>.
Ives et al., Sideways information passing for push-style query processing. In Proc. ICDE, 2008 (12 pages).
Kimball et al., The Data Warehouse Toolkit, Second Edition, The Complete Guide to Dimensional Modeling, 2002 (449 pages).
Krueger, Jens, et al., Fast Updates on Read-Optimized Databases Using Multi-Core CPUs, Aug. 27-31, 2012, pp. 61-72, vol. 5, Issue: 1. <http://www.vldb.org/pvldb/vol5/p061_jenskrueger_vldb2012.pdf>.
Ladwig et al., Linked data query processing strategies. In the Semantic Web ISWC 2010, vol. 6496 of LNCS, 2010 (16 pages).
M. Stonebraker et al., C-store: A column-oriented dbms. In VLDB, 2005 (12 pages).
M. Stonebraker, The case for shared nothing, Database Engineering, 9, 1986 (5 pages).
Neumann et al., Scalable join processing on very large rdf graphs. In Proc. SIGMOD, 2009 (34 pages).
Neumann et al., The rdf-3x engine for scalable management of rdf data. The VLDB Journal, 2010 (58 pages).
Oracle parallel DML, Download date: May 21, 2012. <http://www.dba-oracle.com/t_parallel_dml_updates_inserts.htm>.
The International Searching Authority, Appl No. PCT/US2012/040505, Search Report and the Written Opinion dated Dec. 27, 2012; 8 pages.
Ullman, Jeffrey D., Principles of Database and Knowledge-Base Systems, vol. II: The New Technologies, 1989 (33 pages).
Vertica an HP Company, Vertica Announces Community Edition Version of Vertica Analytic Database, Registration for Vertica Community Edition beta program begins immediately, Oct. 2011 (3 pages).
Wikipedia, "Merge (SQL)", Oct. 14, 2015, 3 pages.

* cited by examiner

300

---

FOR EACH TUPLE IN THE SOURCE LOCATION, DETERMINE WHETHER THERE IS A MATCHED TUPLE IN THE TARGET LOCATION THAT SATISFIES A PREDETERMINED CONDITION
302

↓

FOR EACH MATCHED TUPLE THAT SATISFIES THE PREDETERMINED CONDITION, UPDATE THE MATCHED TUPLE IN THE TARGET LOCATION WITH A COUNT VALUE THAT IS EQUAL TO THE COUNT IN THE SOURCE LOCATION AND THE TARGET LOCATION
304

↓

FOR EACH TUPLE IN THE SOURCE LOCATION THAT DOES NOT HAVE A MATCHED TUPLE THAT SATISFIES THE PREDETERMINED CONDITION, INSERT THE UNMATCHED TUPLE INTO THE TARGET LOCATION
306

*FIG. 3*

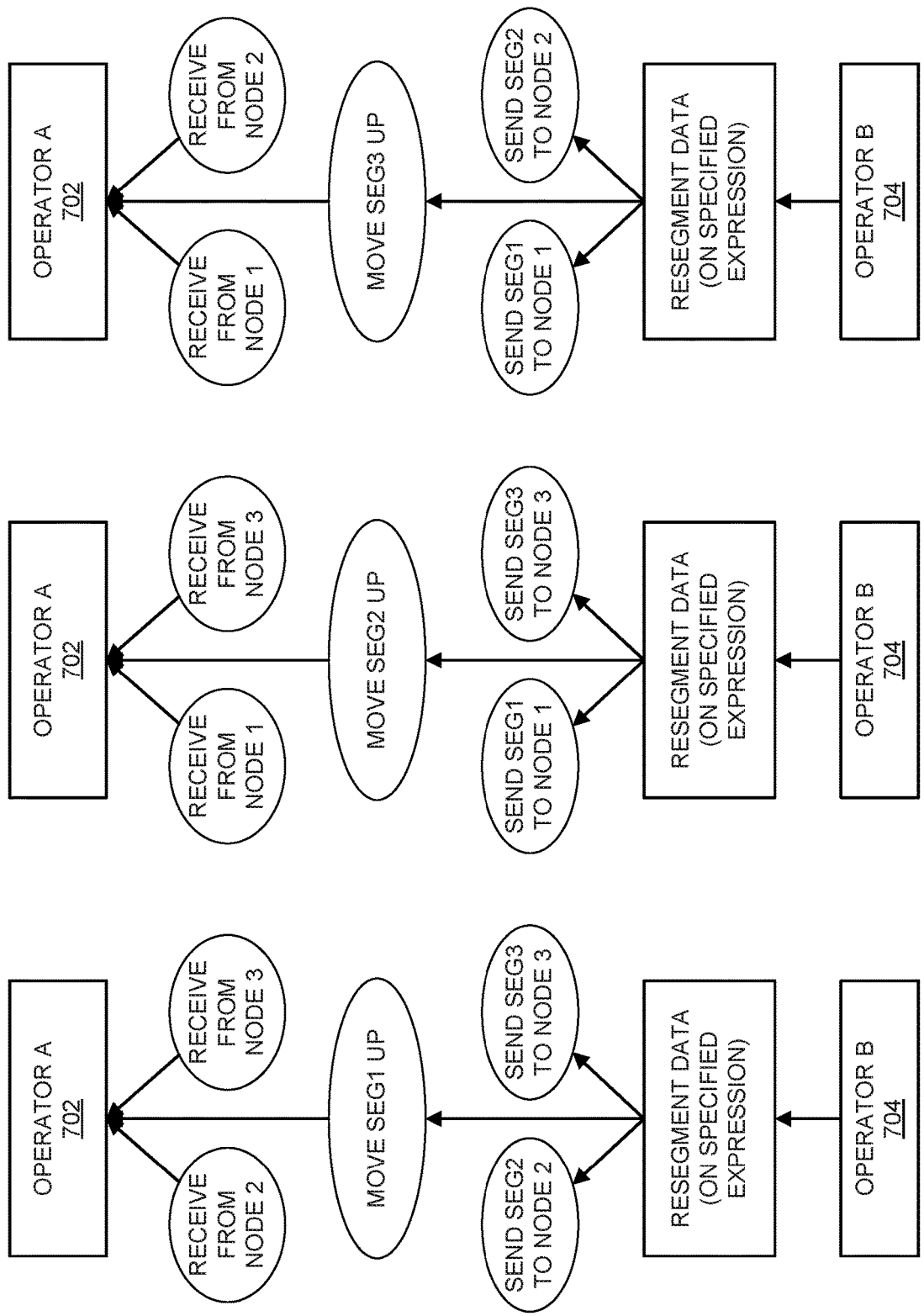

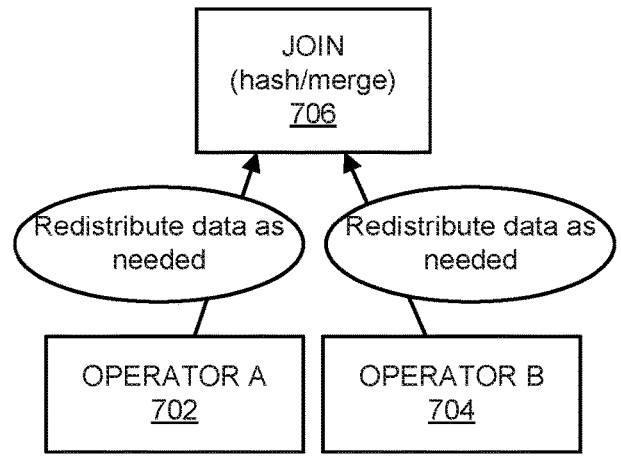
FIG. 10A
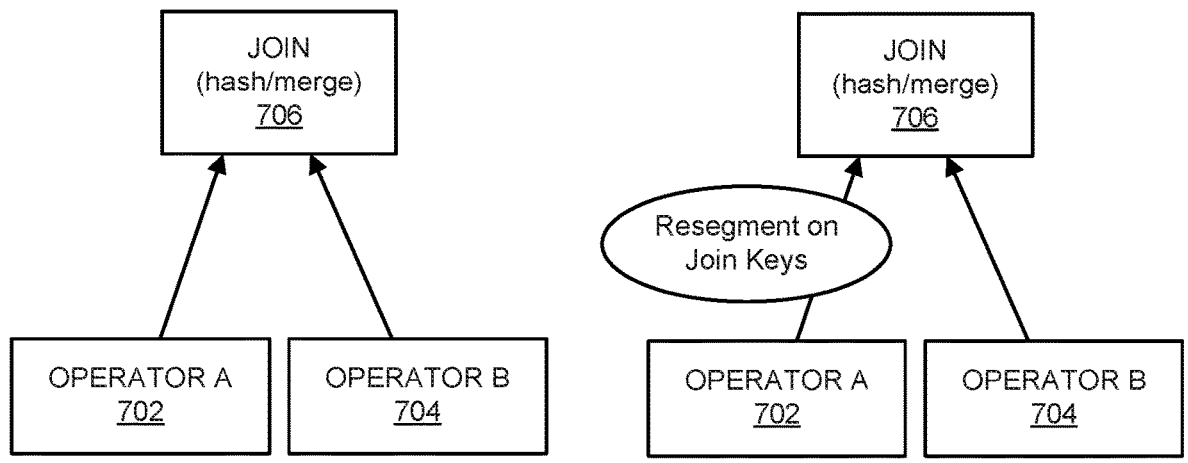
FIG. 10B
FIG. 10C

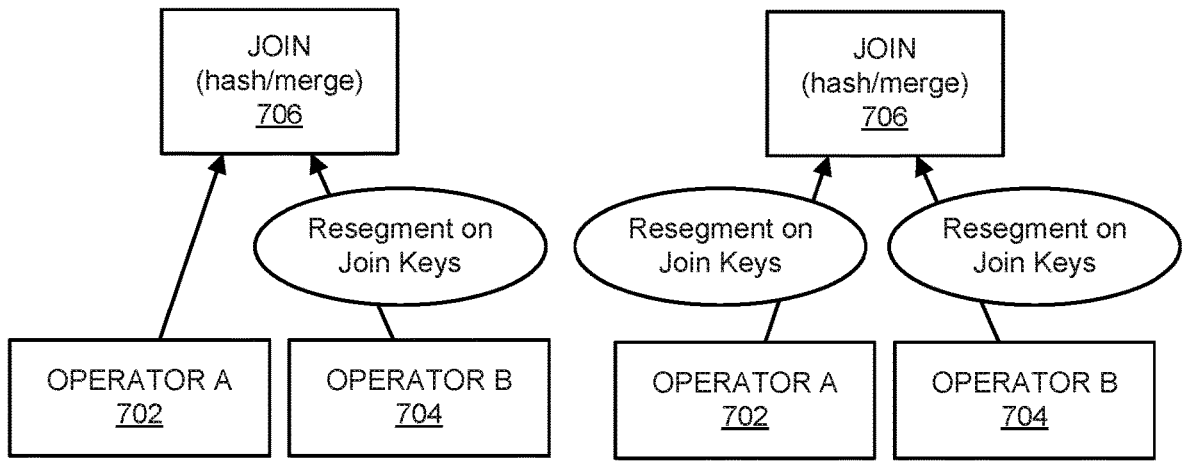
FIG. 10D
FIG. 10E
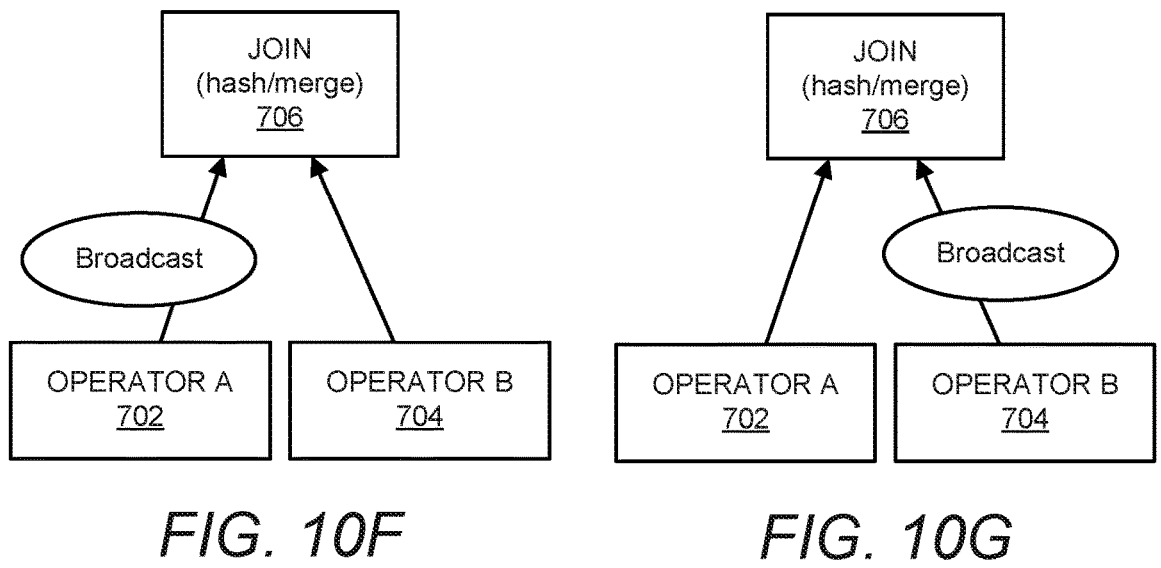
FIG. 10F
FIG. 10G

MERGING DATA FROM A SOURCE LOCATION INTO A TARGET LOCATION

CROSS REFERENCE TO RELATED APPLICATION

This is a continuation of U.S. application Ser. No. 14/398,249, having a national entry date of Oct. 31, 2014, which is a national stage application under 35 U.S.C. § 371 of PCT/US2012/040505, filed Jun. 1, 2012, which are both hereby incorporated by reference in their entirety.

BACKGROUND

Loading new data into existing tables is an important process in most analytic databases. New data is typically loaded into existing tables to ensure that the data contained in the tables is up to date. The new data often includes both data that is new and data that is an update to existing data. Existing methods for loading the data typically employ two separate operations, one operation to load updated data and another operation to load new data.

BRIEF DESCRIPTION OF THE DRAWINGS

Features of the present disclosure are illustrated by way of example and not limited in the following figure(s), in which like numerals indicate like elements, in which:

FIGS. 3-6, respectively, show flow diagrams of methods for merging data from a source location into a target location containing existing data, in which both the source location and the target location contain tuples of data, according to examples of the present disclosure;

FIGS. 7A-7D, 8A-8C, 9A-9C, and 10A-10G, respectively, depict diagrams of manners in which data may be redistributed among a plurality of projections, according to examples of the present disclosure.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

As used throughout the present disclosure, the term "includes" means includes but not limited to, the term "including" means including but not limited to. The term "based on" means based at least in part on. In addition, the terms "a" and "an" are intended to denote at least one of a particular element.

Disclosed herein is a method for merging data from a source location into a target location containing existing data, in which both the source location and the target location contain tuples of data. Also disclosed herein are an apparatus for implementing the method and a non-transitory computer readable medium on which is stored machine readable instructions that implement the method. According to an example, the method for merging data disclosed here comprises a Merge statement, which is implemented or invoked in a Vertica™ column-stored database.

As discussed in greater detail herein below, in the method, the merge operation of the present disclosure performs both an update to existing data and an insertion of new data in the target location during a single merge operation. As such, compared with conventional data loading operations, which require separate update and loading operations, the merge operation of the present disclosure provides a relatively more efficient manner of loading data containing both updates and new data into an existing location. Particularly, in conventional data loading operations, a first operation is required to update the existing tuples with changed tuples, and a second operation is required to insert new tuples. In the second operation, an anti-join operation in the insert query (NOT IN) is required, thus causing the second operation to be very slow. In contrast, the merge operation of the present disclosure is relatively faster because its query plan does not include anti-join operations as discussed in greater detail herein.

Figure 1:
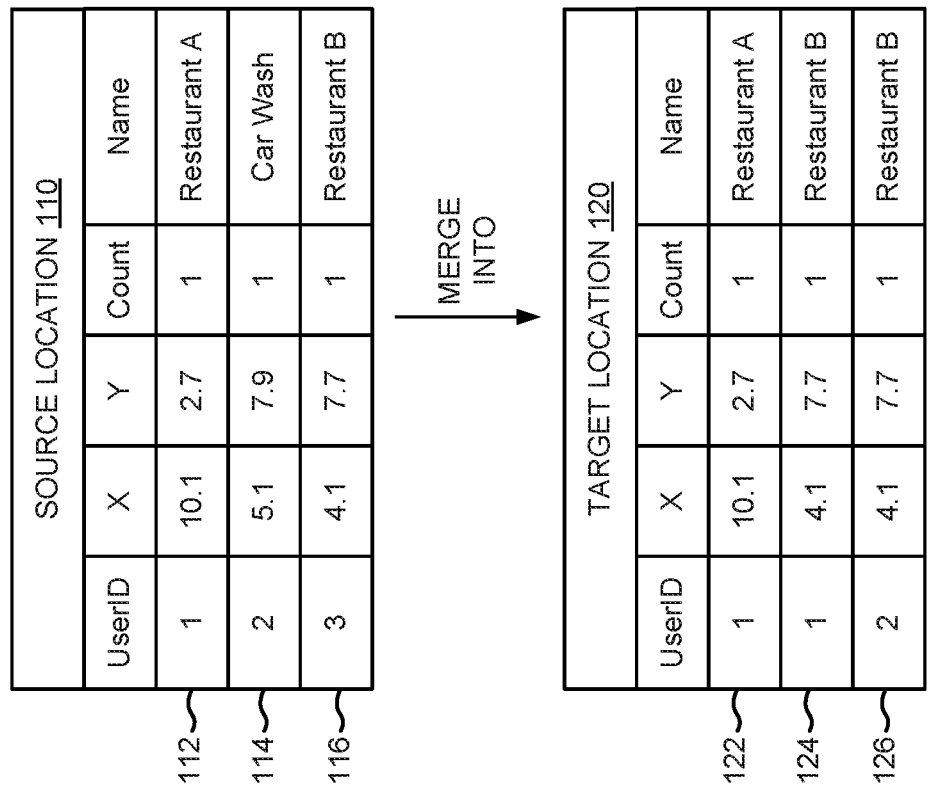
FIG. 1 shows a diagram of a merge operation between a source location and a target location, according to an example of the present disclosure.

With reference first to FIG. 1, there is shown a diagram 100 of a merge operation between a source location and a target location, according to an example of the present disclosure. It should be understood that the data depicted in FIG. 1 is for purposes of illustration only. In addition, the data depicted in FIG. 1 is used in various examples throughout the present disclosure to provide an understanding of the merge operation of the present disclosure. The merge operation of the present disclosure may comprise, for instance, a MERGE statement in an analytic database, such as Vertica™.

As shown in FIG. 1, the data contained in a source location 110 is to be merged into the data contained in a target location 120 to generate a merged location 130. According to an example, the source location 110, the target location 120, and the merged location 130 comprise separate tables or other arrangements stored in separate nodes, e.g., databases, memories, disks, servers, client devices, etc. Alternatively, the source location 110 and the target location 120 comprise data stored in the same node. In any regard, because the target location 120 typically contains a larger amount of data than the source location 110, the data contained in the source location 110 may be merged into the target location 120. In this regard, the merged location 130 may comprise an updated version of the data contained in the target location 120.

Although the source location 110 and the target location 120 have been depicted as having the same number of columns, it should be understood that various aspects of the present disclosure may be implemented in source locations and target locations having different numbers of columns and data types. In one regard, therefore, various aspects of the present disclosure may be implemented with source and target tables that are not the same schema.

The data contained in each of the source location 110 and the target location 120 is depicted as being arranged in tables formed of respective tuples, in which, each of the tuples includes a user identification (UserID), two-dimensional geographic coordinates (X, Y), a count, and a name of a business. In the example of FIG. 1, one of the tuples 112 in the source location 110 is depicted as matching one of the tuples 122 in the target location 120. In addition, the remaining two tuples 114 and 116 in the source location 110 are depicted as not matching any of the tuples 122-126 in the target location 120. In this regard, the tuple 122 in the target location 120 is to be updated and the tuples 114 and 116 in the source location 110 are to be inserted into the target location 120 during the merge operation.

As discussed in greater detail herein, both the updating and the inserting of the data from the source location 110 into the target location 120 are performed during a single merge operation. Particularly, the single merge operation of the present disclosure requires only a single scan to be performed on the source location 110 and a single scan to be performed on the target location 120. In addition, the single merge operation of the present disclosure does not require an anti-join operation. In contrast, conventional operations that seek to load new data into an existing table require that a first scan be performed to update modified data and that a second scan, which includes an anti-join operation, be performed to insert new data. As such, the merge operation of the present disclosure may generally be more efficient as compared with conventional loading operations.

Figure 2:
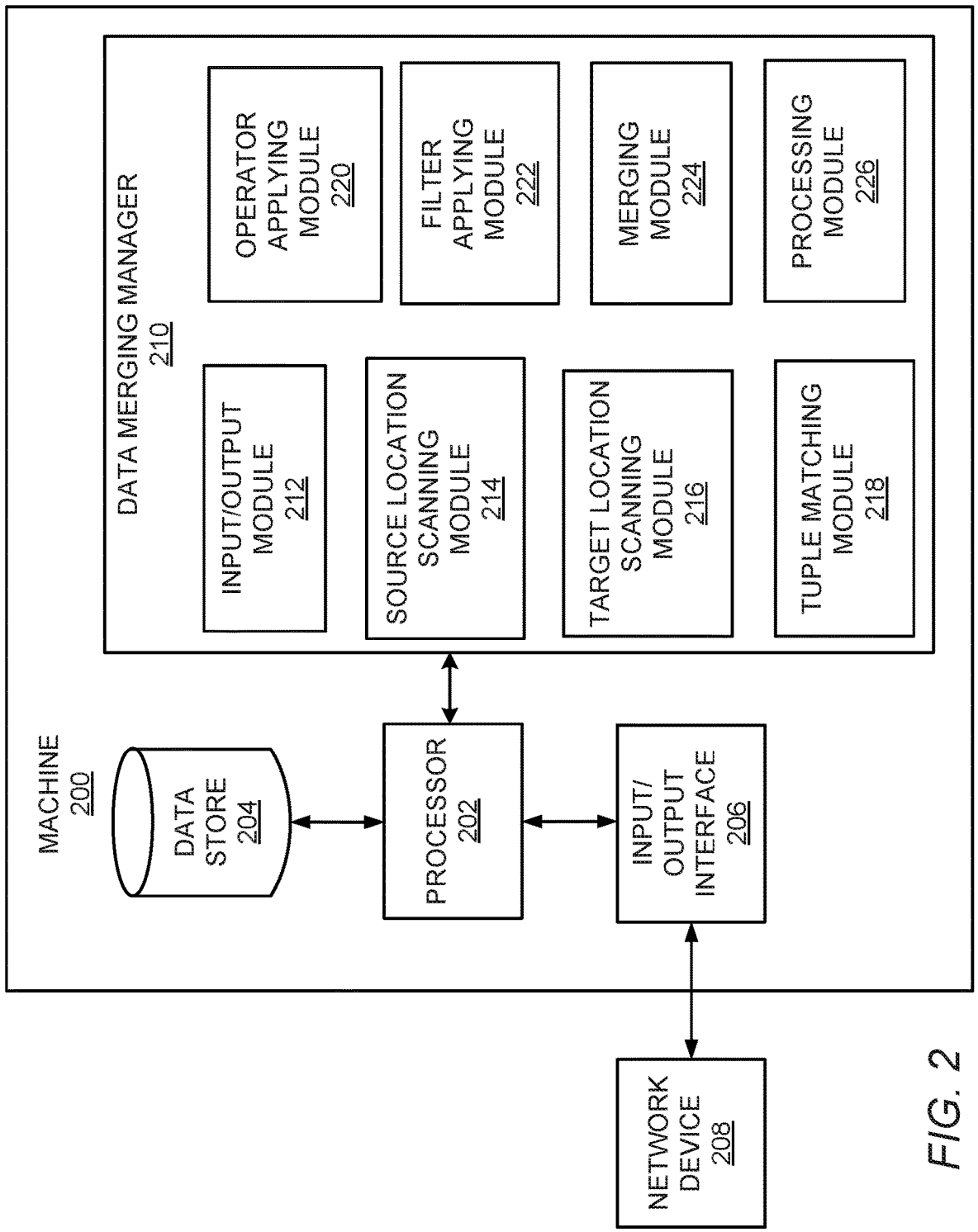
FIG. 2 shows a block diagram of a machine that may implement the merge operation of FIG. 1, according to an example of the present disclosure.

Turning now to FIG. 2, there is shown a block diagram of a machine 200 that may implement the merge operation of FIG. 1, according to an example of the present disclosure. It should be understood that the machine 200 may include additional components and that one or more of the components described herein may be removed and/or modified without departing from a scope of the machine 200.

The machine 200 is depicted as including a processor 202, a data store 204, an input/output interface 206, and a data merging manager 210. The machine 200 comprises any of, for instance, a server, a computer, a laptop computer, a tablet computer, a personal digital assistant, a cellular telephone, or other electronic apparatus that is to perform a method for merging data from a source location into a target location disclosed herein. The machine 200 may store the target location and/or may manage the storage of data in a target location stored in a separate machine, for instance, through a network device 208, which may comprise, for instance, a router, a switch, a hub, etc.

The data merging manager 210 is depicted as including an input/output module 212, a source location scanning module 214, a target location scanning module 216, a tuple matching module 218, an operator applying module 220, a filter applying module 222, a merging module 224, and a processing module 226. The processor 202, which may comprise a microprocessor, a micro-controller, an application specific integrated circuit (ASIC), or the like, is to perform various processing functions in the machine 200. One of the processing functions includes invoking or implementing the modules 212-226 of the data merging manager 210 as discussed in greater detail herein below.

According to an example, the data merging manager 210 comprises a hardware device, such as a circuit or multiple circuits arranged on a board. In this example, the modules 212-226 comprise circuit components or individual circuits. According to another example, the data merging manager 210 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 212-226 comprise software modules stored in the data merging manager 210. According to a further example, the modules 212-226 comprise a combination of hardware and software modules.

The input/output interface 206 comprises a hardware and/or a software interface. In any regard, the input/output interface 206 may be connected to a network, such as the Internet, an intranet, etc., through the network device 208, over which the data merging manager 210 may receive and communicate information, for instance, the data contained in the source location 110 and data contained in other locations. The processor 202 may store information received through the input/output interface 206 in the data store 204 and may use the information in implementing the modules 212-226. The data store 204 comprises volatile and/or non-volatile memory, such as DRAM, EEPROM, MRAM, phase change RAM (PCRAM), Memristor, flash memory, and the like. In addition, or alternatively, the data store 204 comprises a device that is to read from and write to a removable media, such as a floppy disk, a CD-ROM, a DVD-ROM, or other optical or magnetic media.

Various manners in which the modules 212-226 may be implemented are discussed in greater detail with respect to the methods 300-600 depicted in FIGS. 3-6. FIGS. 3-6, respectively depict flow diagrams of methods 300-600 for merging data from a source location into a target location containing existing data, according to examples of the present disclosure. It should be apparent to those of ordinary skill in the art that the methods 300-600 represent generalized illustrations and that other operations may be added or existing operations may be removed, modified or rearranged without departing from the scopes of the methods 300-600. Although particular reference is made to the data merging manager 210 depicted in FIG. 2 as comprising an apparatus and/or a set of machine readable instructions that may perform the operations described in the methods 300-600, it should be understood that differently configured apparatuses and/or machine readable instructions may perform the methods 300-600 without departing from the scopes of the methods 300-600. The methods 400-600 are related to the method 300 in that the methods 400-600 include operations in addition to those included in the method 300. Thus, the methods 400-600 may be construed as including all of the features discussed with respect to the method 300.

Generally speaking, the methods 300-600 may separately be implemented to merge data from a source location into a target location containing existing data, in which both the source location and the target location contain tuples of data. In addition, the data from the source location may be merged with the data contained in the target location with during a single operation. In one regard, therefore, the methods 300-600 may be implemented to merge the data in a relatively more efficient manner than is possible with current data loading operations.

With reference first to FIG. 3, at block 302, for each tuple in the source location, a determination is made as to whether there is a matched tuple in the target location that satisfies a predetermined condition, for instance, by the tuple matching module 218. The determination as to whether there is a matched tuple in the target location for each tuple in the source location may be made during a scan of each of the source location and the target location. In addition, the predetermined condition may comprise that the data contained in selected ones of the columns match. Thus, for instance, in instances where the source location contains a different number of columns than the target location, tuples may be considered as matching when less than all of the data contained in the columns of the source location and the target location match, so long as the data contained in predetermined ones of the columns match each other.

As discussed above with respect to the diagram 100 depicted in FIG. 1, the predetermined condition comprises that the UserID and the X and Y of a tuple in the source location 110 be the same as the UserID and the X and Y of a tuple in the target location 120 for the tuple in the source location 110 to be determined as matching a tuple in the target location 120. In addition, the operation at block 302 results in a determination that the tuple 112 in the source location 110 matches the tuple 122 in the target location 120. The operation at block 302 also results in a determination that the tuples 114 and 116 in the source location 110 do not match any of the tuples in the target location 120.

At block 304, for each matched tuple that satisfies the predetermined condition, the matched tuple in the target location is updated with a count value that is equal to the count of the matched tuple in the source location and the target location, for instance, by the merging module 224. In addition, at block 306, for each tuple in the source location that does not have a matched tuple in the target location that satisfies the predetermined condition, the unmatched tuple is inserted into the target location, for instance, by the merging module 224.

As discussed above with respect to the diagram 100 depicted in FIG. 1, in the tuple 132 in the merged location 130, the count value has been increased to "2", which is an example of a matched tuple existing in the target location being updated at block 304. In addition, tuples 138 and 140 have been inserted into the merged location 130, which is an example of unmatched tuples being inserted into the target location at block 306.

Figure 4:
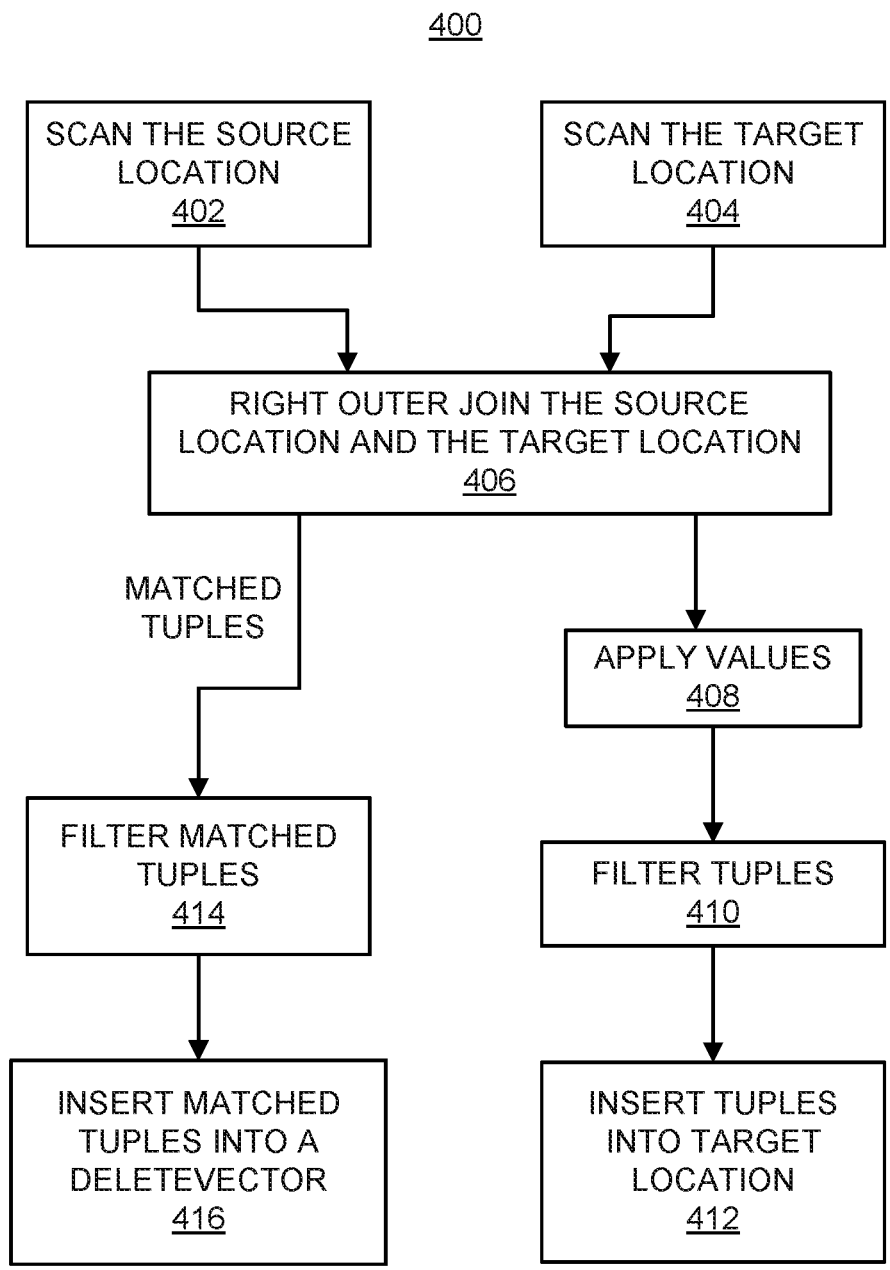

Turning now to FIG. 4, at block 402, the source location is scanned, for instance, by the source location scanning module 214. In addition, at block 404, the target location is scanned, for instance, by the target location scanning module 216. The source location and the target location are scanned to identify the tuples of data contained in each of the source location and the target location. By way of example, the outcome of the scanning of the source location and the target location may be a determination that the source location 110 contains the tuples 112-116 and that the target location 120 contains the tuples 122-126.

At block 406, the source location and the target location are right outer joined, for instance, by the tuple matching module 218. The outcome of the right outer join at block 406 is a determination as to which tuples from the source location are to be inserted into the target location and which tuples in the target location are to be updated. The output tuples of the right outer join operation include both source and target data for the matched tuples, and the source data for the unmatched tuples. According to an example, during implementation of the right outer join, a matching boolean (M) is added to each output tuple, for instance, as a new column (M), to mark whether the tuple is new (M=false) or existing (M=true).

In the diagram 100 depicted in FIG. 1, there is one matched tuple 112, 122 that includes data of the join attributes: userId (1), X (10.1), Y (2.7); other data from the source table: count(1), name ('Restaurant A'), and other data from the target table: count(1), and name('Restaurant A'). The remaining two unmatched tuples 114, 116 include only data from the source location 110.

At block 408, the values of the matched tuples and the unmatched tuples are applied, for instance, by the operator applying module 220. Particularly, the operator applying module 220 may apply an APPLY operator on the matched tuples and the unmatched tuples to apply appropriate expressions for the matched and unmatched tuples. For example, the count of the matched tuple in the target location may be updated to be the computed value (count=tgt.count+src.count). In addition, an appropriate expression for adding the unmatched tuples may be applied.

At block 410, the values of the matched tuples and the unmatched tuples are filtered, for instance, by the filter applying module 222. Particularly, the filter applying module 222 may apply a filter that outputs the correct update and/or insert tuples depending upon whether the tuples are matched or unmatched. By way of example, the filter may perform a doUpdate when the tuples are matched and a doInsert when the tuples are not matched.

At block 412, the filtered tuples are inserted into the target location, for instance, by the merging module 224. Particularly, the updated tuples and the new tuples are inserted in the target location.

At block 414, the tuples in the source location that have been determined as having a matched tuple in the target location are filtered, for instance, by the filter applying module 222. Particularly, the filter applying module 222 filters the matched tuples to output the data of the updated (matched) tuples that are to be inserted into a DeleteVector. In addition, at block 416, the filtered tuples are inserted into the DeleteVector.

As described with respect to the method 400, when an update is performed, data is neither physically updated nor removed from the target location. Instead, the existing tuples are marked removed in the DeleteVector and the updated tuples are not updated but newly inserted into the target location.

According to an example, a Sideways Information Passing (SIPS) operation is performed at blocks 402 and 404, for instance, by the source location scanning module 214 and the target location scanning module 216. The target location may be much larger than the source location because only a small part of the data may need to be updated and inserted. This means that the target location may contain a relatively large number of tuples that are unmatched with the tuples in the source location, and thus joining the unmatched tuples with the source location may be unnecessary and wasteful. In one regard, therefore, the SIPS operation may be performed to eliminate unmatched tuples from the outer input before the join operation at block 406. Particularly, the join first gets data from the inner input (source location), which is usually small, and sends their join attributes (e.g., from FIG. 1, the userID, X and Y) down to the outer input (target location). In the diagram 100 of FIG. 1, there are three such tuples 112-116. The outer input operator then eliminates data whose join attributes do not match with those tuples and sends the remaining tuples to the join. In the diagram 100 of FIG. 1, the tuples 124 and 126 would not be sent to the join. In this example, at block 406, the right outer join is implemented on the source location and the target location following implementation of the SIPS operation.

Figure 5:
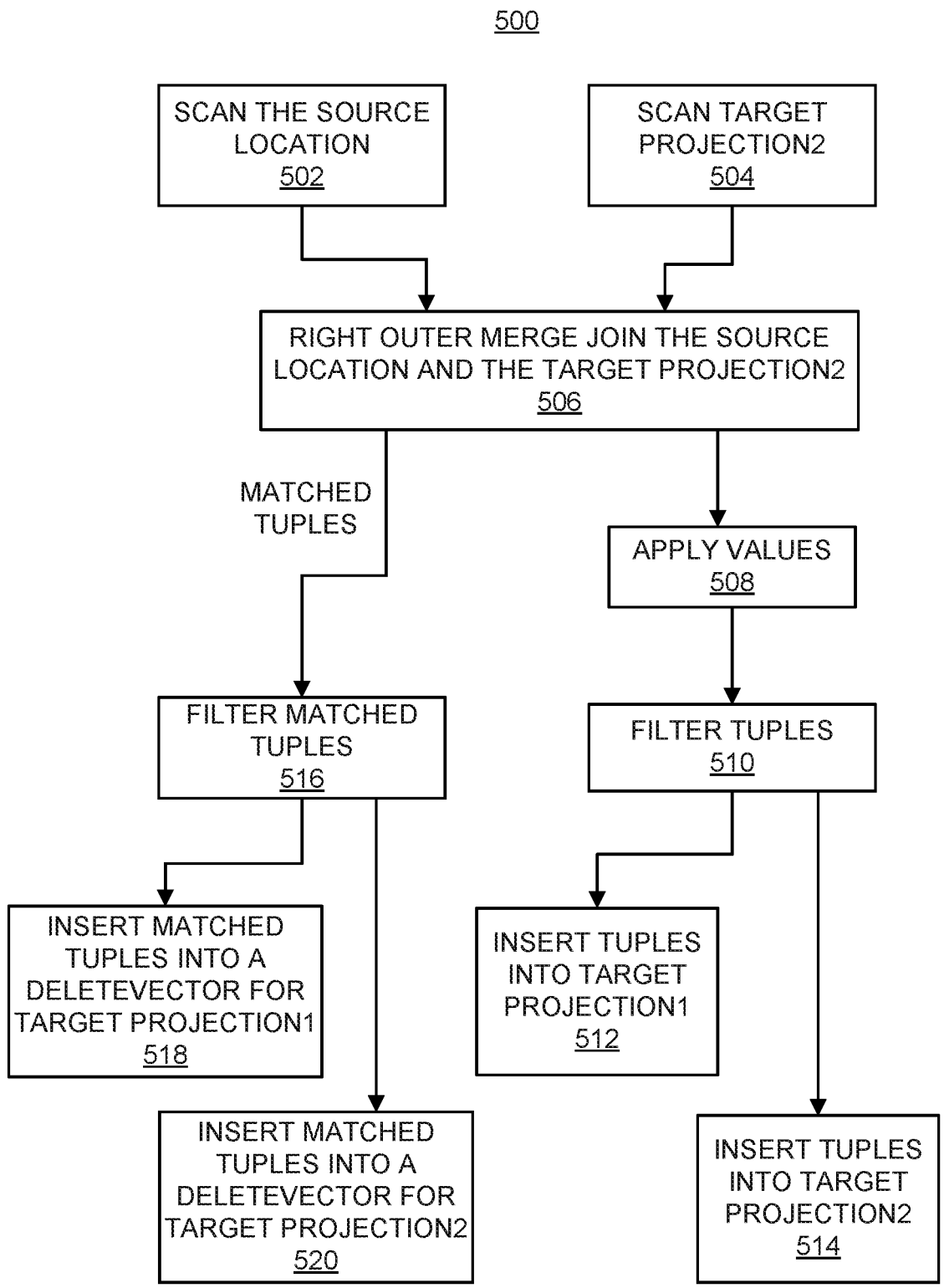

Turning now to FIG. 5, there is shown a flow diagram of a method 500 for merging data from a source location into a target location, according to another example. The method 500 differs from the method 400 depicted in FIG. 4 in that the method 500 pertains to merging data from a source location into a plurality of target projections. Particularly, the method 500 pertains to the merging of data from the source location into two target projections, target projection1 and target projection2. It should, however, be understood that the method 500 may pertain to any number of target projections, including one target projection. Although not shown, the source location may also be a projection.

A projection is a set of columns that are either from a table or a join of different tables. In an analytic database, column data is usually stored redundantly in various projections with different column sort orders or data segmentation. This storage mechanism ensures that queries still work when one or more nodes are down, and improves the performance of many different queries. Hence, in the method 500, the data in the source location is merged into target projection1 and target projection2.

At block 502, the source location is scanned as discussed above with respect to block 402 in FIG. 4. In addition, at block 504, target projection2 is scanned, for instance, in a manner similar to that discussed above with respect to block 404 in FIG. 4. The selection of which of target projection1 and target projection2 that is to be scanned at block 504 may be based upon any of a variety of factors. For instance, the selection of the target projection may be made by an optimization operation that uses any of heuristics and a complex custom-built cost model, based on compression aware I/O, CPU and Network transfer costs, etc. By way of particular example, target projection2 may differ from target projection1 in that target projection1 is not sorted on the query's join attributes, e.g., UserID, X, Y, whereas target projection2 is sorted on the query's join attributes. In this regard, target projection2 may be scanned at block 504 so that a fast merge join may be used to find matched and unmatched tuples between the source location and the target projection2.

At block 506, the source location and the target projection2 are right outer merge joined, for instance, by the tuple matching module 218, to determine which tuples from the source location are to be inserted into the target projection2 and which tuples in the target projection2 are to be updated. The right outer merge join implemented at block 506 is similar to the right outer join discussed above with respect to block 406 in FIG. 4.

According to an example, a SIPS operation is performed at blocks 502 and 504, for instance, by the source location scanning module 214 and the target location scanning module 216, prior to block 506, as also discussed above.

At block 508, the values of the matched tuples and the unmatched tuples are applied, for instance, by the operator applying module 220, to apply appropriate expressions for the matched and unmatched tuples. Block 508 is similar to block 408 in FIG. 4. In addition, at block 510, the values of the matched tuples and the unmatched tuples are filtered, for instance, by the filter applying module 222, as also discussed above with respect to block 410 in FIG. 4.

At block 512, the filtered tuples are inserted into target projection1, for instance, by the merging module 224. In addition, at block 514, the filtered tuples are inserted into target projection2. Particularly, the updated tuples and the new tuples are inserted into both target projection1 and target projection2.

At block 516, the tuples in the source location that have been determined as having a matched tuple in the target projection2 are filtered, for instance, by the filter applying module 222. Particularly, the filter applying module 222 filters the matched tuples to output the data of the updated (matched) tuples that are to be inserted into a DeleteVector. In addition, at block 518, the filtered tuples are inserted into the DeleteVector for target projection1 and at block 520, the filtered tuples are inserted into the DeleteVector for target projection2.

As described with respect to the method 500, when an update is performed, data is neither physically updated nor removed from either of the target projections. Instead, the existing tuples are marked removed in the DeleteVectors of the target projections and the updated tuples are not updated but newly inserted into the target projections.

Figure 6:
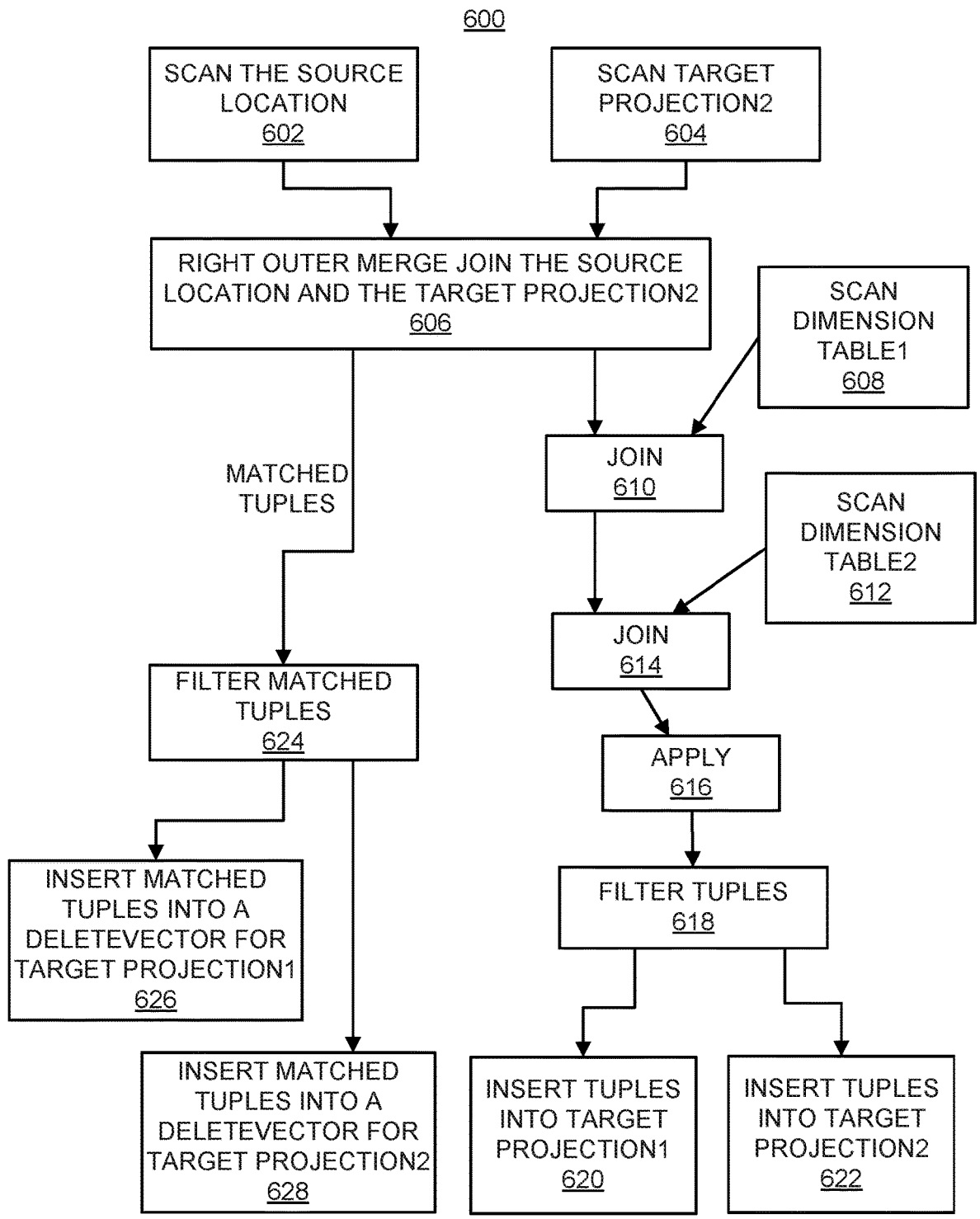

With reference now to FIG. 6, there is shown a flow diagram of a method 600 for merging data from a source location into a target location, according to another example. The method 600 differs from the method 500 depicted in FIG. 5 in that the method 600 also pertains to a pre-join projection, which is a projection used to store the results of a join between a single large fact table, containing attributes of events, with one or more dimension tables, containing descriptive attributes of the events. Although two pre-join operations are described with respect to the method 600, it should be clearly understood that any number of pre-join operations using any number of dimension tables may be implemented without departing from a scope of the method 600.

According to an example in which the single large fact table comprises the target location 120 depicted in FIG. 1, a first dimension table1 includes the names associated with the UserIds. Thus, for purposes of illustration, UserId1 may be associated with the name "John", UserId2 may be associated with the name "Sydney", and UserId3 may be associated with the name "Emily". In addition, a second dimension table2 includes the cities associated with the X and Y coordinates. Thus, for purposes of illustration, the coordinates (4.1, 7.7) may correspond to the city "Andover", the coordinates (5.1, 7.9) may correspond to the city "Cambridge", and the coordinates (10.1, 2.7) may correspond to the city "Boston."

Blocks 602-606 are similar to blocks 502-506, respectively. In addition, and according to an example, a SIPS operation is performed at blocks 602 and 604, for instance, by the source location scanning module 214 and the target location scanning module 216, prior to block 606, as also discussed above.

At block 608, a dimension table1 is scanned, for instance, by the target scanning module 216. In addition, at block 610, a join, e.g., a hash/merge join, is performed on the output of the right outer merge join performed at block 606 and the data contained in the dimension table1, for instance, by the processing module 226. The join at block 610 generally joins the data contained in the dimension table1 with the data contained in right outer merge joined source location and the target projection2. By way of particular example, and with reference to the diagram 100 in FIG. 1, the join at block 610 may add the identification data, i.e., names, associated with the UserIds.

At block 612, a dimension table2 is scanned, for instance, by the target scanning module 216. In addition, at block 614 a join, e.g., a hash/merge join, is performed on the output of the join performed at block 610 and the data contained in the dimension table2, for instance, by the processing module 226. The join at block 614 generally joins the data contained in the dimension table2 with the data contained in the source location, the target projection2, and the dimension table1. By way of particular example, and with reference to the diagram 100 in FIG. 1, the join at block 610 may add the city information associated with the X and Y coordinates in the target location 120.

Blocks 616-628, respectively, are similar to blocks 508-520 in FIG. 5 and are thus not described in greater detail herein.

In various instances, data is distributed across different nodes of a database cluster. According to an example, a process of data redistribution is performed before insert and join operators in any of the methods 300-600 discussed above to substantially ensure that the appropriate data reaches the appropriate operators. Particularly, a determination is made that data is to be redistributed among multiple ones of the plurality of projections (or target locations). In addition, the data is redistributed among multiple ones of the plurality of projections in response to a determination that data is to be redistributed among multiple ones of the plurality of projections.

Figure 7A:
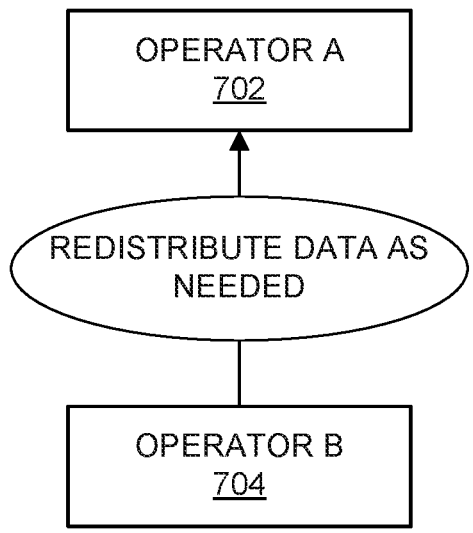

Generally speaking, redistributing data to an INSERT operator is a unary redistribution because the source of the data is from a single operator, FILTER. To generalize this process, and for purposes of example, the INSERT operator has been named 'Operator A' and the FILTER operator has been named 'Operator B' in FIGS. 7A-7D, 8A-8C, 9A-9C, and 10A-10G, which respectively depict diagrams of manners in which data may be redistributed among a plurality of projections, according to a plurality of examples. FIG. 7A shows a general redistribution of data from Operator B 704 to Operator A 702.

Figure 7B:
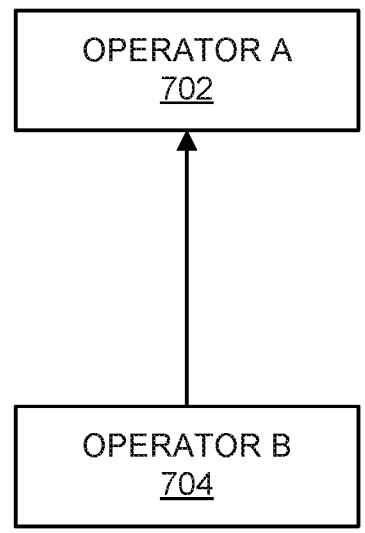

According to a first example, using the heuristics that the less data transferred the faster the plan, the data may be redistributed according to any of the following manners. In a first manner, and as shown in FIG. 7B, if each node of the cluster of Operator A 702 is expecting data on the same node of Operator B 704, no redistribution is needed. Instead, data is moved up locally from Operator B 704 to Operator A 702. This occurs, for instance, when data from Operator B 704 is already segmented as required by Operator A 702.

Figure 7C:
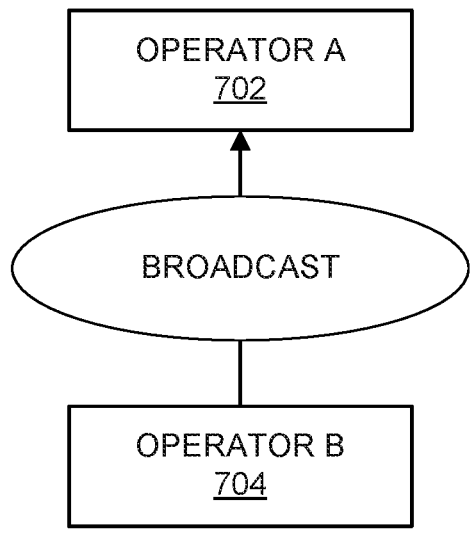

In a second manner, if each node of the cluster of Operator A 702 is expecting all of the data, the data at each node of Operator B 704 must be broadcast (sent all) to all nodes of Operator A 702, as shown in FIG. 7C, and described further in detail below with respect to the FIGS. 8A-8C. This occurs when data from Operator B 704 is segmented while Operator A 702 requires all the data.

Figure 7D:
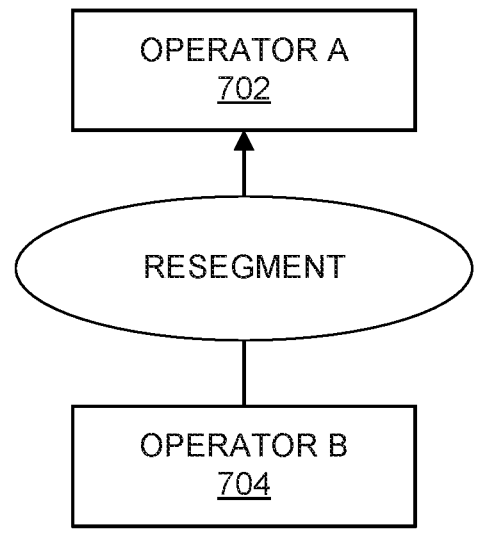

In a third manner, if each node of the cluster of Operator A 702 is expecting a segment/range of the data that is different from the segment/range of the data of Operator B 704 on the same node, the data at each node of Operator B 704 must be resegmented to the same segment/range with Operator A 702 and then sent to Operator A 702 as shown in FIG. 7D, and described further in detail below with respect to FIGS. 9A-9C. This occurs when data from Operator B 704 is segmented but on different segment/range required by Operator A 702.

Figure 8C:
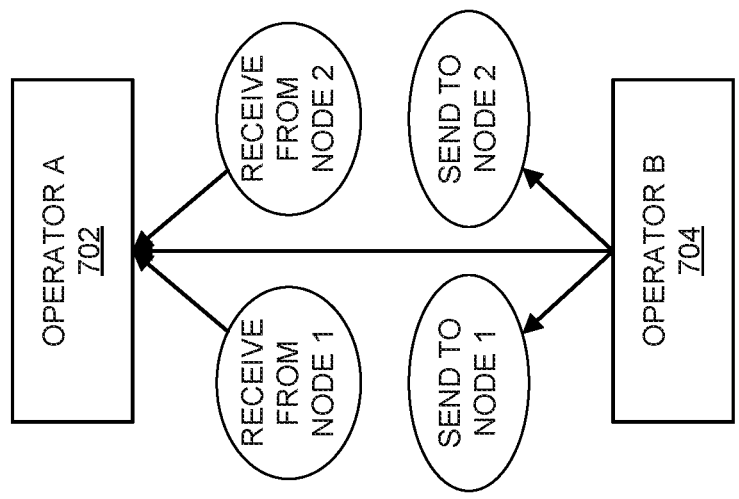
Figure 8B:
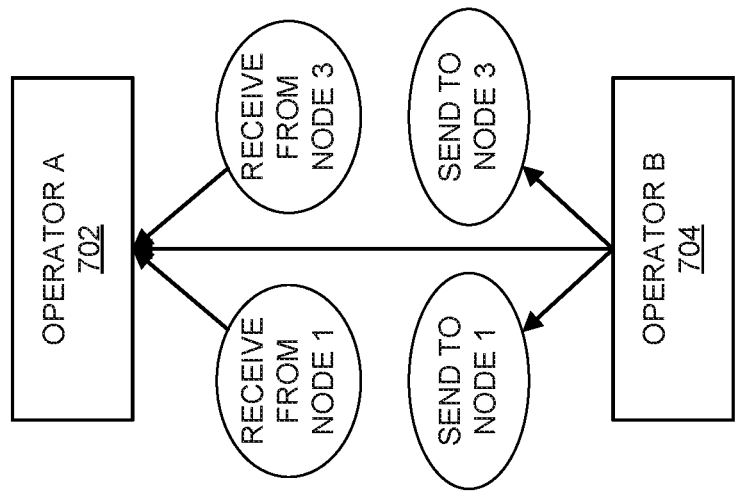
Figure 8A:
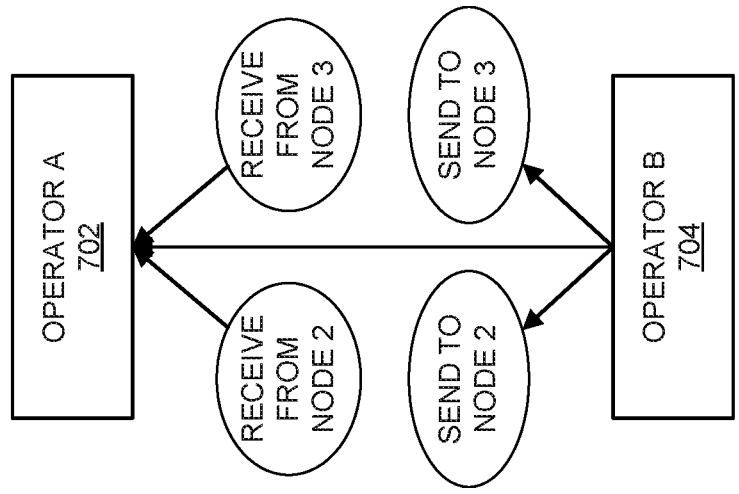

FIGS. 8A-8C, respectively, show the broadcasting process from Operator B 704 to Operator A 702 on a three-node cluster. Particularly, FIG. 8A shows the process at node 1, where the output data of Operator B 704 is moved directly up to Operator A 702, and sent to Operator A 702 on node 2 and node 3. The Operator A 702 at node 1, besides getting data from Operator B 702 on its own node, also waits to receive data sent from Operator B 702 on node 2 and node 3. A similar process is performed on node 2 and node 3 as illustrated in FIGS. 8B and 8C, respectively.

FIGS. 9A-9C, respectively, show resegmentation processes for a three-node cluster, which include two main steps: (1) resegment the output data of the Operator B 704 on the expression specified in Operator A 702, and (2) send the right data segments to the corresponding nodes of Operator A 702. FIG. 9A demonstrates the process at node 1, where the output data of Operator B 704 is first segmented on the expression specified in Operator A 702 to three segments: seg1, seg2, and seg3. Then seg1 is moved up to the node's Operator A 702, while seg2 and seg3 are sent to Operator A 702 of node 2 and node 3, respectively. The Operator A 702 at node 1, besides getting seg1 from Operator B 704 on its own node, also waits to receive the remaining data of seg1 sent from Operator B on node 2 and node 3. A similar process is performed on node 2 and node 3 and illustrated in FIGS. 9B and 9C, respectively.

The data segmentation expression required from the INSERT operator in the MERGE plan is the data segmentation of the target location. Depending on the data segmentation of the INSERT operators (or target location) and the data segmentation of their input operators (FILTER in this case), the corresponding data redistribution on-the-fly (none or broadcast or resegment) will be chosen.

Redistributing data to a JOIN operator 706 is said to be a binary redistribution because the source of the data is from two input operators, as shown in FIG. 10A. In general, at each node, the JOIN operator 706 will join certain segments/ranges of data from the outer input and the inner input such that its result will be a subset of the whole join result. In other words, the union of all per-node join results will be the final join results, and the intersection of per-node join results will be empty. Thus, redistributing data to a join is dependent upon the data segmentation of the two join inputs and also based on the basic heuristic, that the less data transferred the faster the plan. As such, the data distribution is classified into six categories as depicted in FIGS. 10B-10G.

Particularly, as shown in FIG. 10B, redistribution is not needed if the data of the two join inputs are co-located by either (1) both being already segmented on their join attributes, or (2) by one being segmented on the join attributes, while the other is replicated (full copy of data is stored at each node), or (3) both inputs are replicated. Resegmenting data of the outer input on the join attributes if the data of the inner input is already segmented on the join attributes, as shown in FIG. 10C. Resegmenting data of the inner input on the join attributes if the data of the outer input is already segmented on the join attributes, as shown in FIG. 10D. Resegmenting both inner and outer data on the join attributes if neither are segmented on the join attributes yet, as shown in FIG. 10E. Broadcasting data from the outer to the inner if both are segmented but not on the join attributes and the outer's data is much smaller than the inner's, as shown in FIG. 10F. Broadcasting data from the inner to the outer if both are segmented but not on the join attributes and the inner's data is much smaller than the outer's, as shown in FIG. 10G.

According to an example, an optimizer selects one of the choices described in FIGS. 10B-10G to redistribute the data for a join based on a custom-built cost model. In addition, there is a restriction in the outer-join in that data of the outer side cannot be broadcast. This is because the outer join does not eliminate tuples of the outer side and would lead to duplicate tuples when a union of the results of all nodes is later created. As the join between the source and target tables in the MERGE plan is a right-outer-join, the data redistribution that broadcasts the inner input to outer input as shown in FIG. 10G cannot be used.

Some or all of the operations set forth in the methods 300-600 may be contained as a utility, program, or subprogram, in any desired computer accessible medium. In addition, the methods 300-600 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 11:
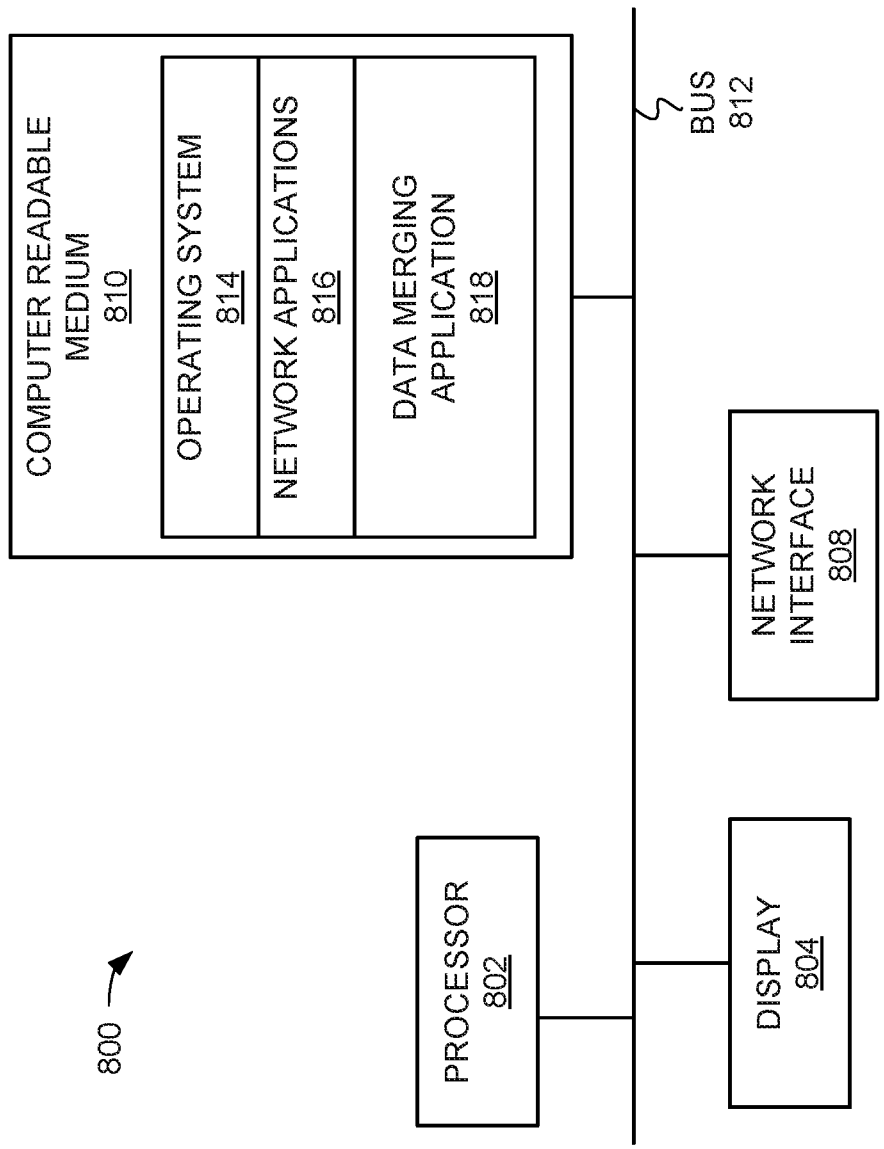
FIG. 11 illustrates a schematic representation of a computing device, which may be employed to perform various functions of the machine depicted in FIG. 2, according to an example of the present disclosure.

Turning now to FIG. 11, there is shown a schematic representation of a computing device 800, which may be employed to perform various functions of the machine 200 depicted in FIG. 2, according to an example. The computing device 800 includes a processor 802, such as but not limited to a central processing unit; a display device 804, such as but not limited to a monitor; a network interface 808, such as but not limited to a Local Area Network LAN, a wireless 802.11 LAN, a 3G/4G mobile WAN or a WiMax WAN; and a computer-readable medium 810. Each of these components is operatively coupled to a bus 812. For example, the bus 812 may be an EISA, a PCI, a USB, a FireWire, a NuBus, or a PDS.

The computer readable medium 810 comprises any suitable medium that participates in providing instructions to the processor 802 for execution. For example, the computer readable medium 810 may be non-volatile media, such as memory. The computer-readable medium 810 may also store an operating system 814, such as but not limited to Mac OS, MS Windows, Unix, or Linux; network applications 816; and a data merging application 818. The operating system 814 may be multi-user, multiprocessing, multitasking, multithreading, real-time and the like. The operating system 814 may also perform basic tasks, such as but not limited to recognizing input from input devices, such as but not limited to a keyboard or a keypad; sending output to the display 804; keeping track of files and directories on medium 810; controlling peripheral devices, such as but not limited to disk drives, printers, image capture device; and managing traffic on the bus 812. The network applications 816 include various components for establishing and maintaining network connections, such as but not limited to machine readable instructions for implementing communication protocols including TCP/IP, HTTP, Ethernet, USB, and FireWire.

The data merging application 818 provides various components for merging data from a source location into a target location (projection(s)) as discussed above with respect to the methods 300-600 in FIGS. 3-6. The data merging application 818 may thus comprise the input/output module 212, the source location scanning module 214, the target location scanning module 216, the tuple matching module 218, the operator applying module 220, the filter applying module 222, the merging module 224, and the processing module 226. In this regard, the data merging application 818 may include modules for performing at least one of the methods 300-600.

In certain examples, some or all of the processes performed by the application 818 may be integrated into the operating system 814. In certain examples, the processes may be at least partially implemented in digital electronic circuitry, or in computer hardware, machine readable instructions (including firmware and software), or in any combination thereof, as also discussed above.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method executed by a system comprising a processor of merging data from a source database location into a target database location containing existing data, wherein the source database location and the target database location contain tuples of data, and the existing data of the target database location is distributed across different database nodes, the method comprising:
    redistributing the existing data of the target database location among the different database nodes;
    for each tuple in the source database location, during a respective operation in a database system,
        determining whether there is a matched tuple in the target database location that satisfies a predetermined condition;
        for the matched tuple that satisfies the predetermined condition, updating the matched tuple in the target database location with a count value that is equal to a count of a number of times the matched tuple appears in the source database location and in the target database location, and associating a first indicator with the matched tuple in the target database location, the first indicator indicating that the matched tuple in the target database location is an existing tuple; and
        for an unmatched tuple in the source database location that does not match a tuple that satisfies the predetermined condition in the target database location, inserting the unmatched tuple into the target database location, and associating a second indicator with the unmatched tuple inserted into the target database location, the second indicator indicating that the unmatched tuple is new in the target database location.

2. The method of claim 1, wherein the updating comprises:
    inserting the matched tuple into a delete vector;
    marking the matched tuple in the delete vector as removed from the target database location, without physically removing the matched tuple from the target database location; and
    inserting the updated matched tuple into the target database location.

3. The method of claim 1, further comprising:
    scanning the source database location and the target database location to determine the tuples contained in each of the source database location and the target database location,
    wherein determining whether there is a matched tuple in the target database location that satisfies the predetermined condition comprises right outer joining the source database location and the target database location to determine which tuples from the source database location are to be inserted into the target database location and which tuples in the target database location are to be updated.

4. The method of claim 3, wherein the right outer joining of the source database location and the target database location comprises adding a matching indicator to each output tuple produced by the right outer joining to mark whether the output tuple is new or existing, wherein the matching indicator comprises one of the first indicator or the second indicator.

5. The method of claim 1, wherein the target database location comprises a projection, the method further comprising:
scanning the source database location and the projection to determine the tuples contained in each of the source database location and the projection,
wherein determining whether there is a matched tuple in the target database location that satisfies the predetermined condition comprises determining whether there is a matched tuple in the projection by right outer merge joining the source database location and the projection to determine which tuples from the source database location are to be inserted into the projection and which tuples in the projection are to be updated.

6. The method of claim 5, wherein the target database location comprises a plurality of projections, the method further comprising:
selecting one of the plurality of projections based upon a factor, wherein the scanning comprises scanning both the source database location and the selected one of the plurality of projections, wherein the projection that is right outer merge joined with the source database location is the selected one of the plurality of projections.

7. The method of claim 6, further comprising:
scanning a dimension table containing descriptive attributes of events;
joining the descriptive attributes of events in the dimension table with data contained in an additional projection and a join result of the right outer merge joining of the source database location and the selected one of the plurality of projections;
inserting unmatched tuples from the join result into each of the plurality of projections; and
updating matched tuples from the join result in each of the plurality of projections.

8. The method of claim 7, further comprising:
determining that the existing data is to be redistributed among the different database nodes,
wherein the redistributing of the existing data among the different database nodes is in response to a determination that the existing data is to be redistributed among the different database nodes.

9. The method of claim 1, wherein the matched tuple in the target database location that satisfies the predetermined condition comprises one or more columns that match respective one or more columns in a tuple in the source database location.

10. An apparatus for merging data from a source database location into a target database location containing existing data, wherein the source database location and the target database location contain tuples of data, and the existing data of the target database location is distributed across different database nodes, the apparatus comprising:
a processor; and
a non-transitory storage medium storing instructions executable on the processor to:
redistribute the existing data of the target database location among the different database nodes;
as part of an operation in a database system, scan the source database location and the target database location to determine the tuples contained in each of the source database location and the target database location;
right outer join the source database location and the target database location to determine unmatched tuples from the source database location to be inserted into the target database location, and matched tuples in the target database location to be updated;
for each matched tuple of the matched tuples in the target database location that are to be updated, update the matched tuple in the target database location with a count value that is equal to a count of a number of times the matched tuple appears in the source database location and in the target database location, and associate a first indicator with the matched tuple in the target database location, the first indicator indicating that the matched tuple in the target database location is an existing tuple; and
for each unmatched tuple of the unmatched tuples in the source database location that are to be inserted into the target database location, insert the unmatched tuple into the target database location, and associate a second indicator with the unmatched tuple inserted into the target database location, the second indicator indicating that the unmatched tuple is new in the target database location.

11. The apparatus of claim 10, wherein the instructions are executable on the processor to:
add a matching indicator to each output tuple of a result of the right outer join to mark whether the output tuple is new or existing, wherein the matching indicator is one of the first indicator or the second indicator;
insert existing tuples into a delete vector; and
insert new tuples and the existing tuples into the target database location.

12. The apparatus of claim 11, wherein the instructions are executable on the processor to:
apply a first filter to output the new tuples into the delete vector;
apply expressions for the existing tuples and the new tuples; and
apply a second filter to output the new tuples and the existing tuples prior to inserting the new tuples and the existing tuples into the target database location.

13. The apparatus of claim 12, wherein the instructions are executable on the processor to:
implement a sideways information passing operation that eliminates new tuples from the target database location before performance of the right outer join.

14. The apparatus of claim 10, wherein the updating comprises:
inserting the matched tuple into a delete vector;
marking the matched tuple in the delete vector as removed from the target database location, without physically removing the matched tuple from the target database location; and
inserting the updated matched tuple into the target database location.

15. The apparatus of claim 10, wherein the matched tuple in the target database location comprises one or more columns that match respective one or more columns in a tuple in the source database location.

16. A non-transitory computer readable storage medium storing machine readable instructions that when executed cause a system to merge data from a source database location into a target database location containing existing data, wherein the source database location and the target database location contain tuples of data, and the existing data of the target database location is distributed across different database nodes, the machine readable instructions when executed causing the system to:
redistribute the existing data of the target database location among the different database nodes;

as part of an operation in a database system, scan the source database location and the target database location to determine the tuples contained in each of the source database location and the target database location;

right outer join the source database location and the target database location to determine unmatched tuples from the source database location to be inserted into the target database location, and matched tuples in the target database location to be updated;

for each matched tuple of the matched tuples in the target database location that are to be updated, update the matched tuple in the target database location with a count value that is equal to a count of a number of times the matched tuple appears in the source database location and in the target database location, and associate a first indicator with the matched tuple in the target database location, the first indicator indicating that the matched tuple in the target database location is an existing tuple; and for each unmatched tuple of the unmatched tuples in the source database location that are to be inserted into the target database location, insert the unmatched tuple into the target database location, and associate a second indicator with the unmatched tuple inserted into the target database location, the second indicator indicating that the unmatched tuple is new in the target database location.

17. The non-transitory computer readable storage medium of claim 16, wherein the updating comprises:

inserting the matched tuple into a delete vector;

marking the matched tuple in the delete vector as removed from the target database location, without physically removing the matched tuple from the target database location; and inserting the updated matched tuple into the target database location.

18. The non-transitory computer readable storage medium of claim 16, wherein the matched tuple in the target database location comprises one or more columns that match respective one or more columns in a tuple in the source database location.

* * * * *